United States Patent
Feng et al.

(10) Patent No.: US 8,339,969 B2
(45) Date of Patent: Dec. 25, 2012

(54) DISTRIBUTED ETHERNET SYSTEM AND METHOD FOR DETECTING FAULT BASED THEREON

(75) Inventors: Dongqin Feng, Hangzhou (CN); Han Zhang, Hangzhou (CN); Jian Chu, Hangzhou (CN); Jianxiang Jin, Hangzhou (CN)

(73) Assignees: Supcon Group Co., Ltd., Hangzhou, Zhejiang Province (CN); Zhejiang University, Hangzhou, Zhejiang Province (CN)

( * ) Notice: Subject to any disclaimer, the term of this patent is extended or adjusted under 35 U.S.C. 154(b) by 274 days.

(21) Appl. No.: 12/595,239

(22) PCT Filed: Aug. 13, 2007

(86) PCT No.: PCT/CN2007/070458
§ 371 (c)(1),
(2), (4) Date: Oct. 9, 2009

(87) PCT Pub. No.: WO2008/131624
PCT Pub. Date: Nov. 6, 2008

(65) Prior Publication Data
US 2011/0026394 A1    Feb. 3, 2011

(30) Foreign Application Priority Data
Apr. 27, 2007   (CN) .......................... 2007 1 0097678

(51) Int. Cl.
*H04L 12/26*    (2006.01)
(52) U.S. Cl. ........................................ 370/242
(58) Field of Classification Search .................. None
See application file for complete search history.

(56) References Cited

U.S. PATENT DOCUMENTS

| | | | |
|---|---|---|---|
| 4,663,748 A | 5/1987 | Karbowiak et al. | |
| 5,712,856 A * | 1/1998 | Finney et al. | 714/712 |
| 6,574,197 B1 | 6/2003 | Kanamaru et al. | |
| 6,639,893 B1 * | 10/2003 | Chikenji et al. | 370/217 |
| 7,822,049 B1 * | 10/2010 | Moncada-Elias et al. | 370/252 |
| 2004/0010627 A1 | 1/2004 | Ellis et al. | |
| 2004/0151172 A1 | 8/2004 | Notani et al. | |
| 2004/0223503 A1 * | 11/2004 | Lynch et al. | 370/404 |
| 2005/0207348 A1 | 9/2005 | Tsurumi et al. | |
| 2006/0092853 A1 * | 5/2006 | Santoso et al. | 370/252 |
| 2007/0253330 A1 | 11/2007 | Tochio et al. | |

(Continued)

FOREIGN PATENT DOCUMENTS
CN    1751489 A    3/2006
(Continued)

OTHER PUBLICATIONS

RAD DataCommunications "Resilient Fast Ethernet Ring Technology" White Paper Nov. 2002, pp. 1-12.*

(Continued)

*Primary Examiner* — Anh-Vu Ly
(74) *Attorney, Agent, or Firm* — Wolf, Greenfield & Sacks, P.C.

(57) ABSTRACT

A distributed ethernet system including a plurality of switches, which switches are connected in sequence to form a ring, where after being synchronized in clock, each of the switches sequentially performs loop detection and protocol machine detection periodically according to a predetermined configuration, and sends a fault alarming message when a loop fault or a protocol machine fault occurs. A fault detecting method based on the system is further provided.

16 Claims, 6 Drawing Sheets

U.S. PATENT DOCUMENTS

2008/0095047 A1* 4/2008 Skalecki et al. .............. 370/225
2010/0238813 A1* 9/2010 Allan et al. ................... 370/252

FOREIGN PATENT DOCUMENTS

| CN | 1812300 A | 8/2006 |
|---|---|---|
| CN | 1885799 A | 12/2006 |
| CN | 100534048 | 4/2007 |
| EP | 1434393 A2 | 6/2004 |
| JP | 2000082053 | 3/2000 |
| JP | 2003234747 | 8/2003 |
| JP | 2005269059 | 9/2005 |
| WO | WO 2006/072996 A1 | 7/2006 |

OTHER PUBLICATIONS

International Search Report dated Jan. 31, 2008 from corresponding International Application No. PCT/CN2007/070458.

European Search Report dated Apr. 13, 2010 from corresponding European Application No. 07800934.

Dongqin, F. et al., *Study on Real-time Communication Models for Ethernet-based Industrial Control Network*, National Laboratory of Industrial Control Technology, Zhejiang University, Yugu Road 20, Hangzhou 310027, China, Sep. 26, 2005, pp. 891-894.

Japanese Office Action for Application No. 2010-504423 dated Sep. 8, 2011.

* cited by examiner

DISTRIBUTED ETHERNET SYSTEM AND METHOD FOR DETECTING FAULT BASED THEREON

This application claims priority to Chinese Patent Application No. 200710097678.6 filed Apr. 27, 2007 and entitled "DISTRIBUTED ETHERNET SYSTEM AND FAULT DETECTING METHOD BASED THEREON", which is incorporated herein by reference as if reproduced in its entirety.

FIELD OF THE INVENTION

The present invention relates to the field of ethernet communication technologies, and in particular to a distributed ethernet system and a fault detecting method based thereon.

BACKGROUND OF THE INVENTION

Along with the development of ethernet technologies, ethernet plays more and more rolls in industrial circumstances. The benefit increase and operation stability of industrial production require the industrial ethernet to be more and more reliable. Therefore, the high availability of industrial ethernet attracts more and more attention.

Figure 1:
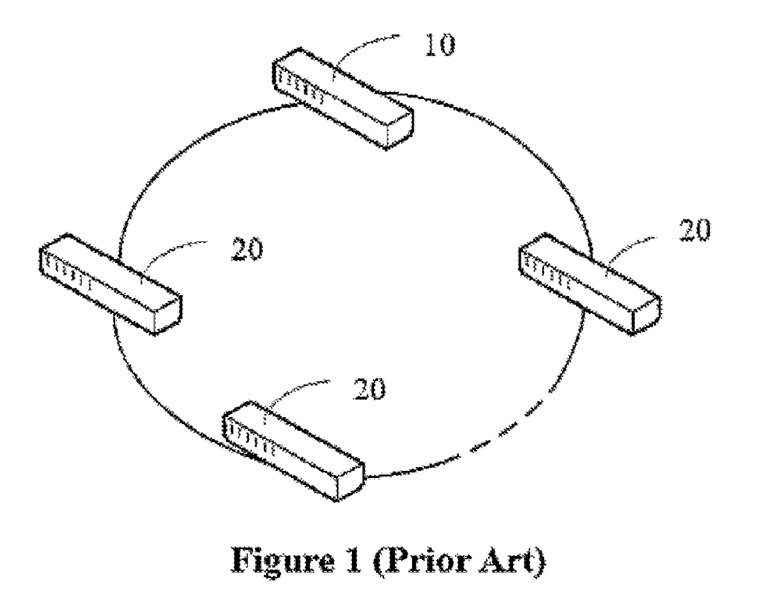
FIG. 1 is a diagram illustrating a structure of a system in the prior art.

At present, a commonly used ethernet system is the master-slave ring redundancy system, as shown in FIG. 1. In the ring redundancy system, the master switch 10 (the master apparatus) controls the operation of the whole network system, so as to ensure that the network is available when encountering a single fault (a single fault means that, the fault occurs in only one element among all switches and all network lines connecting the switches in the whole ring system). According to the master-slave ethernet system, each slave switch 20 is responsible for monitoring its own operation, and sending a fault alarm to the master switch when detecting a fault in it. The master switch sends a detecting message to the network in a time-setting way, monitors the operation of the network, processes the fault alarm from the slave switch, and determines a fault recovery action for the slave switch according to the fault alarm from the slave switch.

In the conventional master-slave ring redundancy system described above, for the reason that the master switch is responsible for the operation of the network and the recovery of the fault in a centralized way, network risks are highly converged on the master switch. If a fault occurs in the master switch, the network may be down, thus the reliability is low.

SUMMARY OF THE INVENTION

In view of the problem, the present invention seeks to provide a distributed ethernet system to solve the problem of the prior art that network risks are converged on a single switch thus causing the reliability to be low.

The distributed ethernet system provided by the present invention is implemented as follows:

A distributed ethernet system including a plurality of switches, which switches are connected in sequence to form a ring, wherein after being synchronized in clock, each of the switches sequentially performs loop detection and protocol machine detection periodically according to a predetermined configuration, and sends a fault alarming message when a loop fault or a protocol machine fault occurs.

Preferably, each switch of the switches includes:
a clock synchronizing unit, adapted to adjust the switch to be synchronous in clock with the system;

a loop detecting unit, adapted to perform detection for a loop of the system;

a self checking unit, adapted to check an operation status of a link connected with the switch when the loop detecting unit detects occurrence of a fault in the loop of the system, and performs a recordation;

a protocol machine detecting unit, adapted to perform the protocol machine detection for an adjacent switch of the switch;

a fault alarming unit, adapted to send in a multicast manner an alarming message containing information used for indicating a type of the fault and a location at which the fault occurs when at least one of the loop detecting unit, the self checking unit and the protocol machine detecting unit detect the fault; and a state setting unit, adapted to set a protocol state of a ring port of the switch according to an instruction from the predetermined configuration and based on the state of the ring port of another switch when at least one of the loop detecting unit, the self checking unit and the protocol machine detecting unit detect the fault.

Preferably, the loop detecting unit includes:

a first sending unit, adapted to send in the multicast manner a loop fault detecting message via two ring ports of the switch periodically, wherein the loop fault detecting message includes a Media Access Control (MAC) address of the switch and information used for indicating the protocol state of the ring port; and a first determining unit, adapted to determine after the first sending unit sends the loop fault detecting message whether the two ring ports of the switch receive the loop fault detecting message sent from an opposite end when a loop detection cycle is finished, to determine that the system operates normally if so, and to determine that the loop fault occurs in the system otherwise.

Preferably, the loop detecting unit further includes:

a second determining unit, adapted to receive the loop fault detecting message sent from another switch, to determine whether the same loop fault detecting message is received during a time period equal to a message delivery cycle, to determine that the system operates normally if so, and to determine that the loop fault occurs in the system otherwise.

Preferably, the protocol machine detecting unit includes:

a second sending unit, adapted to send in a unicast manner a link fault detecting message via two ring ports of the switch to the adjacent switch periodically, wherein the link fault detecting message includes a Media Access Control (MAC) address of the switch, a Media Access Control address of the adjacent switch and information used for indicating the protocol state of the ring port; and a third determining unit, adapted to determine after the second sending unit sends the link fault detecting message whether the two ring ports of the switch receives the link fault detecting message sent from the adjacent switch when a protocol machine detection cycle is finished, to determine that a protocol machine of the adjacent switch operates normally if so, and to determine that the protocol machine fault occurs in the adjacent switch otherwise.

Preferably, the state setting unit includes:

a first state setting unit, adapted to set the protocol state of the two ring ports of the switch as an "initializing" state before the clock synchronizing unit completes a clock synchronization operation, and to set the protocol state of the two ring ports of the switch as "blocking" after the clock synchronizing unit completes the clock synchronization operation;

a second state setting unit, adapted to set the protocol state of the two ring ports of the switch as a "forwarding" state when the switch receives a message containing information used for indicating that the ring port is in the "blocking" state, and to set the state of one of the ring ports of the switch as "blocking" and the state of another as "forwarding" when the switch finds out that the ring port of any other switch in the ring all is in the "forwarding" state;

a third state setting unit, adapted to set the state of the ring port of the switch which ring port is connected with the link as "blocking" when the self checking unit detects a fault in the link, and to maintain the "blocking" state for the ring port when the loop detecting unit of the switch determines that the ring of the system is recovered to operate normally;

a fourth state setting unit, adapted to set the protocol state of the ring port connected with the adjacent switch as "blocking" when the protocol machine detecting unit determines that the protocol machine fault occurs in the adjacent switch, and to set the state of the ring port of the switch as "forwarding" when the protocol machine detecting unit determines that the switch in which the protocol machine fault occurs is recovered to operate normally; and a fifth state setting unit, adapted to set the protocol state of the ring port of the switch as "forwarding" after receiving the alarming message from the loop.

The present invention further provides a fault detecting method based on a distributed ethernet system, which includes:

performing clock synchronization for all switches contained in the system;

performing loop detection and protocol machine detection periodically according to an instruction from a predetermined configuration; and sending a fault alarming message when a loop fault or a protocol machine fault occurs.

Preferably, the loop detection is performed according to following steps:

sending, by each of the switches, in a multicast manner a loop fault detecting message via two ring ports of the switch to the system at a predetermined time interval;

detecting a link connected with the switch if not both of the two ring ports of the switch receive the loop fault detecting message sent from the ring port of an opposite end when a message delivery cycle is finished;

setting a state of the ring port of the switch which ring port is connected with the link as "blocking" if a fault occurs in the link connected with the switch or if the link is disconnected, and further determining the protocol state of the ring port of another switch otherwise; and setting the state of one of the two ring ports of the switch as a "forwarding" state and the state of another as the "blocking" state if the protocol state of the ring port of any other switch all is "forwarding", and setting the protocol state of the two ring ports of the switch both as "forwarding" otherwise.

Preferably, the protocol machine detection is performed according to following steps:

sending, by all the switches when a protocol machine detection cycle starts, a link fault detecting message to an adjacent switch simultaneously; and when the link connected with the switch operates normally, determining whether the ring port of the switch receives a protocol machine detecting message sent from the adjacent switch when the protocol machine detection cycle is finished, determining that the adjacent switch operates normally if so, and determining that the protocol machine fault occurs in the adjacent switch otherwise.

Preferably, the fault alarming message is sent according to following steps:

sending, by all the switches in the system, the fault alarming message in the multicast manner after the protocol machine detection is completed, wherein the fault alarming message includes information used for indicating occurrence of the loop fault and/or the protocol machine fault and information used for indicating a location at which the fault occurs.

It can be understood from the above technical solution that, being compared with the prior art, using the loop detecting unit and the protocol machine detecting unit, all the switches according to the present invention can perform detection for the switch and the loop of the system. In other words, one switch has an equal function to another, and there is no such a difference with respect to the master/slave switches, thus following the principle of fairness in the ethernet communication and solving the problem of the highly converged risks resulted from the uncontrollable influence on the network caused by the fault of the master switch.

DETAILED DESCRIPTION OF THE EMBODIMENTS

In the conventional ring redundancy system, due to its master-slave structure, the operation of the network and the recovery of the fault presented in the network both need to be controlled by the master apparatus, and the network risks are highly converged on the master apparatus. Once a fault occurs in the master apparatus, the network may be down.

According to the present invention, each switch in the network of the system can perform fault detection for the switch or the loop of the system, and one switch plays an equal roll to another, so as to avoid the problem in the prior art that the reliability of the system is low due to all fault detecting operations being converged on the master apparatus.

In order to make those skilled in the art understand the technical solution of the present invention better, the technical solution of the present invention is described in detail hereinbelow with reference to the appended drawings and the embodiments.

Figure 2:
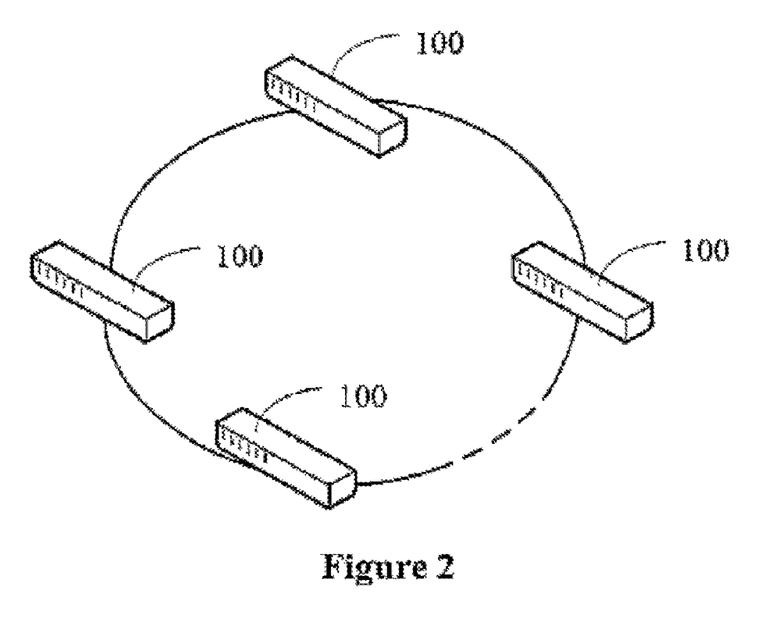
FIG. 2 is a diagram illustrating a structure of a distributed ethernet system according to a first embodiment of the present invention.

FIG. 2 is a diagram illustrating a structure of a distributed ethernet system according to a first embodiment of the present invention.

The system includes a plurality of ethernet switches. All ethernet switches are connected in sequence to form a network topology structure as a ring. Each ethernet switch includes two ports, which are herein called "ring ports", and the ring port has three protocol states: "initializing", "forwarding" and "blocking".

A port in the "blocking" state or the "initializing" state can forward only the loop fault detecting message and the link fault detecting message (the loop fault detecting message is mainly used for detecting whether there is a fault in the link of the network, and the link fault detecting message is used for detecting whether the adjacent switch operates normally and whether the link between the switch and the adjacent switch operates normally), and discards any other data message. A port in the "forwarding" state can forward all kinds of data messages.

Before being connected to the ring, each industrial ethernet switch is required to be deployed with a configuration, which includes: a time length of the detection cycle that all the switches send the loop fault detecting message and the link fault detecting message (the detection cycle equals to the sum of a system loop detection cycle, a protocol machine detection cycle and the time for sending the alarming message) and an offset relative to the detection cycle, according to which offset every switch sends the loop fault detecting message and the link fault detecting message.

The system loop detection cycle T=Switch_Number*(T1+interval), where the Switch_Number refers to the amount of the switches in the system, the T1 refers to the time required for a message to be delivered a cycle in the system loop (for clarity, it is called a "message delivery cycle of the loop" hereinbelow), and the "interval" refers to the time interval at which adjacent switches send the message. T1=Switch_Number*Maxhandltime, where the Maxhandltime is the maximum processing time for the switch to process the message.

Figure 3:
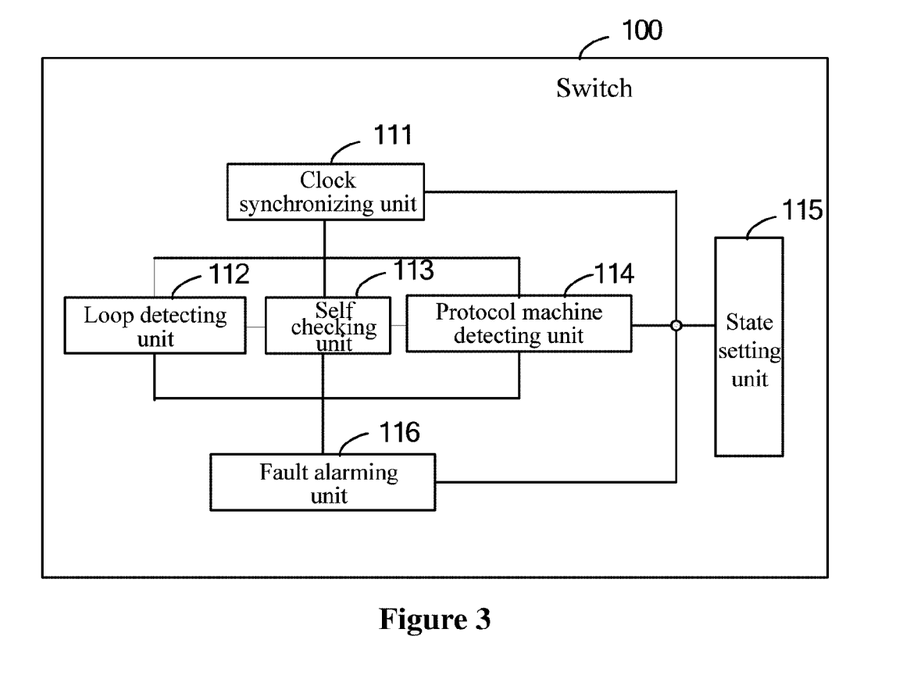
FIG. 3 is a diagram illustrating a structure of a switch of the distributed ethernet system according to a second embodiment of the present invention.

FIG. 3 is a diagram illustrating a structure of a switch of the system according to a second embodiment. Each switch contained in the system includes: a clock synchronizing unit 111, a loop detecting unit 112, a self checking unit 113, a protocol machine detecting unit 114, a state setting unit 115 and a fault alarming unit 116.

The clock synchronizing unit 111 adjusts the switch to be synchronous in clock with the system when the switch is connected to the system. Among all the switches contained in the system, only one represents a master clock which acts as the clock source for all the switches in the whole system. Other switches act as dependent clocks of the clock source, and are synchronized with the master clock. The clock synchronizing unit 111 implements synchronization with the clock source of the system for the switch according to the IEEE1588 protocol. Specific method thereof is the same as the prior art and is not described in detail herein.

After the switches complete the clock synchronization, the loop detecting units 112 send in a multicast manner loop fault detecting messages via the two ring ports of the switch in a time-setting way simultaneously, so as to detect the loop of the system. If the two ring ports of the switch both receive loop fault detecting messages sent from the opposite port (another ring port of the switch which ring port is located at the same ring) during a loop detection cycle, it can be determined that the loop of the system operates normally. Otherwise, it is determined that a loop fault occurs in the system. The information contained in the loop fault detecting message includes: a redundant field of the port, the identifier of the switch, and the link state and the protocol state of the two ring ports.

When sending the loop fault detecting message, each switch also receives the loop fault detecting message sent from another switch of the system. The loop detecting unit 112 also determines whether the loop fault occurs according to the loop fault detecting message sent from another switch.

The self checking unit 113 is adapted to check an operation status of a link connected with the switch after the loop detecting unit 112 detects occurrence of a fault in the loop of the system, and to perform a recordation. The specific detection process is performed according to the IEEE 802.3 standard, which belongs to the prior art and is not described in detail herein.

All the switches in the system send link fault detecting messages via the two ring ports through the protocol machine detecting units of the switches simultaneously when the system loop detection cycle is finished, and determine whether the ring port receives the link fault detecting message from the adjacent switch when the protocol machine detection cycle is finished. If it is received, it is determined that the adjacent switch connected with the ring port via the link operates normally. Otherwise, it is determined that a protocol machine fault occurs in the adjacent switch connected with the ring port via the link. The link fault detecting message includes the Media Access Control (MAC) address of the switch, the MAC address of the adjacent switch, and information of the protocol state of the ring port and the like.

It should be noted that, in order to ensure that the transmission of the messages in the system does not influence the transmission of normal data, all the switches do not perform detection for the system continuously, and there is a fixed time interval between the loop fault detecting messages sent from two switches, which time interval is called a protocol data time interval. The time interval is calculated from the network time occupied by the loop fault detecting message and the bandwidth utilization ratio of the method.

The state setting unit 115 is adapted to set the protocol state of the ring port of the switch according to the above configuration and the detection result of the loop detecting unit 112 and the protocol machine detecting unit 114. The state setting unit 114 sets the protocol state of the ring port of the switch as "initializing" before the clock synchronizing unit 111 synchronizes the switch with the clock source of the system, and sets the protocol state of the ring port of the switch as "blocking" after the clock synchronizing unit 111 completes synchronization with the clock source of the system for the switch. When the system loop detection cycle starts, the first switch sends a loop fault detecting message. After receiving the loop fault detecting message sent by the first switch, the state setting unit 115 of another switch in the system sets the protocol state of the two ring ports of this switch as "forwarding". When the system loop detection cycle is finished, in the case that it is found that the loop of the system operates normally, the first switch receives the loop fault detecting message sent from all the switches in the system. If it is found out that the ring ports of the switches are all in the "forwarding" state, the state setting unit 115 of the first switch sets the protocol state of one of the two ring ports as "blocking", and the protocol state of another ring port as "forwarding", thus avoiding occurrence of loopback in the network.

If the loop detecting unit 114 detects occurrence of a loop fault in the system, the self checking unit 113 of the switch checks the operation status of the link connected with the switch to determine whether it is broken or it is disconnected. If so, the state setting unit 115 sets the protocol state of the ring port connected with the link as "blocking".

If the protocol machine detecting unit 114 detects occurrence of a protocol machine fault in the adjacent switch, the state setting unit 115 of the switch sets the protocol state of the ring port connected with such a switch as "blocking", and sets the protocol state of the ring port as "forwarding" after the recovery from the fault. The state setting unit 115 of the switch which has been recovered from the fault sets the protocol state of one of the two ring ports of the switch as the "blocking" state, and sets another as the "forwarding" state. Hence, it can be ensured that in the ring of the system, there is only one ring port is in the "blocking" state, thus avoiding occurrence of loopback in the network.

The fault alarming unit 116 is adapted to send an alarming message in a multicast manner when the protocol machine detection cycle is finished. The alarming message includes information used for indicating the type (a link fault or a protocol machine fault) of the fault and the location at which the fault occurs.

It should be noted that, for the reason that the loop fault detecting message is sent from two ring ports of the switch, after one ring port of each switch in the system receives the loop fault detecting message sent from another switch, the loop detecting unit 112 determines whether a loop fault detecting message identical to the above loop fault detecting message is received from another ring port when the message delivery cycle is finished. If it is received, it can be determined that the loop of the system operates normally. Otherwise, it is determined that a fault occurs in the loop of the system.

In order to ensure that those skilled in the art can understand the operation principle and the operation process of the system better, the system is described in more detail hereinbelow with reference to another embodiment.

Figure 4:
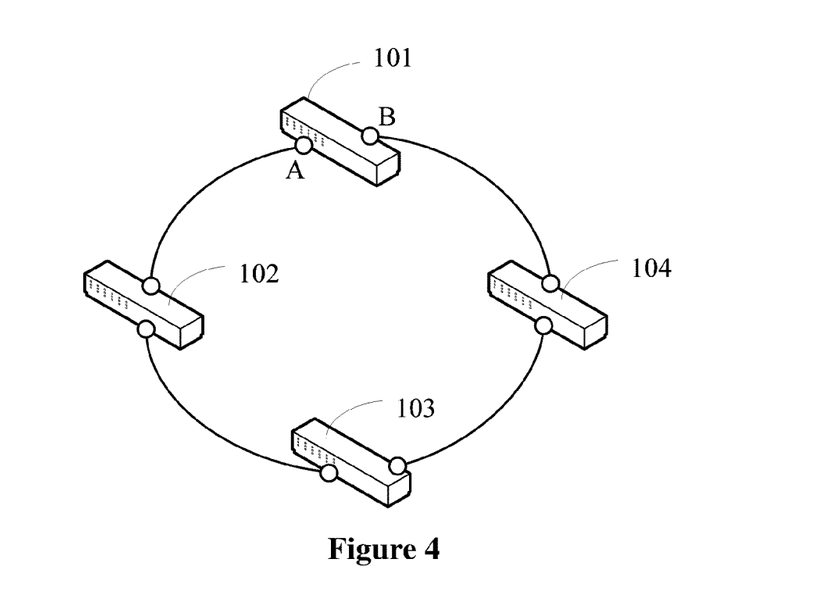
FIG. 4 is a diagram illustrating a structure of the distributed ethernet system according to a third embodiment of the present invention.

FIG. 4 is a diagram illustrating a structure of the system according to a third embodiment.

It is assumed that the system includes the first switch 101, the second switch 102, the third switch 103 and the fourth switch 104. The state setting unit 114 of each switch sets the protocol state of the two ring ports of the switch as "initializing" before clock synchronization is completed, and sets the protocol state of the two ring ports as the "blocking" state after the clock synchronization is completed. Then, all the switches in the system sequentially send the loop fault detecting messages to the network via the ring port of the switch. The loop fault detecting message contains information of the protocol state of the ring port and the Media Access Control (MAC) address of the switch. For example, the loop detecting unit of the first switch 101 sends the loop fault detecting message to the ring of the system via the ring port A or B. Another switch receives the loop fault detecting message from a port, the state setting unit 115 thereof sets the state of each ring port of the another switch as the "forwarding" state, and according to the Quality of Service (QoS), the message is forwarded out from another ring port of the switch at the highest priority. If the loop detecting unit 112 determines that, during a loop fault detection cycle, the ring port B of the first switch 101 receives the loop fault detecting message sent from the ring port A of the first switch 101, and the ring port A of the first switch 101 receives the loop fault detecting message sent from the ring port B, it is determined that the link of the ring of the system operates normally. Otherwise, it is determined that a fault occurs in the link of the ring of the system. If the link between the first switch 101 and the second switch 102 is broken, the second switch 102 and the first switch 101 which are connected with the link can detect the fault through the self checking unit 113, and make a recordation.

The above fault is a "link fault" of the system. The "link fault" means that a fault occurs in the communication link connected between two industrial ethernet switches. When such a fault occurs, the switch (such as the first switch 101 in the above embodiment) that sends the loop fault detecting message cannot receive the loop fault detecting message sent from the two ring ports during a message delivery cycle.

The fault in the system further includes another type of fault, i.e. a "protocol machine fault".

The "protocol machine fault" means that, due to occurrence of a fault in the protocol machine of the switch, the detecting messages and link fault alarming messages of various types cannot be processed and sent. Although the fault has no influence on common data processing, the protocol machine of the switch in which the fault occurs cannot operate, and at this time, it is possible that none of the state of the ring ports in the loop of the system is the "blocking" state, i.e. it is possible that loopback may occur in the network.

According to the above system, whether a "link fault" occurs in the ring of the system can be determined according to the loop fault detecting message, but neither occurrence of a "protocol machine fault" nor the switch in which the fault occurs can be determined. Thus, in order to determine whether a "protocol machine fault" occurs in the ring of the system and the switch in which the fault occurs, after the loop detecting units 112 of all the switches in the system complete the loop fault detection, the protocol machine detecting unit 114 of the switch in the system sends a link fault detecting message to the ring of the system with a delay of predetermined time. The link fault detecting message contains information of: the redundant field, the protocol state of the ring port, the MAC address of the switch, and the MAC addresses of the adjacent two switches. The predetermined time equals to the time interval "interval" used for the loop detecting units of two switches in the system to send the loop fault detecting message.

The link fault detecting message is sent by the protocol machine detecting unit 114 in a unicast manner, i.e. it is only sent to the adjacent two switches and is not sent to any other switch. Moreover, the message does not need to be forwarded by another switch when being delivered from the source address to the destination address. Thus, the problem resulted from network channel sharing does not exist, and therefore, all the switches can send the link fault detecting messages simultaneously.

If the self checking unit 113 determines that every link connected with the switch operates normally, the protocol machine detecting unit 114 determines whether the ring port of the switch receives the link fault detecting message from the adjacent switch when the protocol machine detection cycle is finished. If so, it is determined that the adjacent switch operates normally. Otherwise, it is determined that a protocol machine fault occurs in the adjacent switch. For example, the first switch 101 in FIG. 4 sends the link fault detecting message to the second switch 102 and the fourth switch 104 via the ring port A and the ring port B respectively.

After the link fault detecting message is sent, if no link fault detecting message from the fourth switch 104 is received during a predetermined time period, the protocol machine detecting unit 114 of the first switch 101 determines that a "protocol machine fault" occurs in the fourth switch 104, and the state setting unit 115 of the switch sets the protocol state of the ring port B as the "blocking" state.

When the protocol machine detection cycle is finished, the fault alarming unit 116 in the first switch 101 sends an alarming message in a multicast manner. The alarming message contains information used for indicating that a "protocol machine fault" occurs in the switch 104. After receiving the alarming message, the state setting units 115 of the second switch 102 and the third switch 103 set the state of the ring ports of such switches as "forwarding", so as to ensure the network to operate normally.

Figure 5:
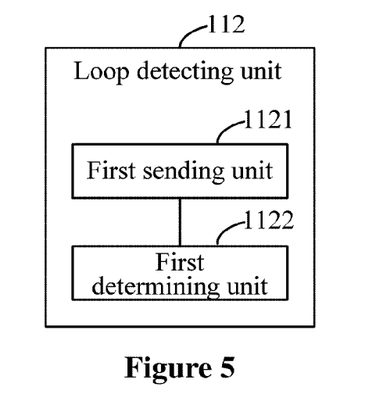
FIG. 5 is a diagram illustrating a structure of a loop detecting unit of the distributed ethernet system according to a fourth embodiment of the present invention.

FIG. 5 is a diagram illustrating a structure of a loop detecting unit of the switch according to a fourth embodiment of the system.

The loop detecting unit 112 of the switch in the system may include the first sending unit 1121 and the first determining unit 1122. The first sending unit 1121 sends in a multicast manner the loop fault detecting message via the two ring ports of the switch periodically. The loop fault detecting message includes the Media Access Control (MAC) address of the switch and information used for indicating the protocol state of the ring port. The first determining unit 1122 determines after the first sending unit 1121 sends the loop fault detecting message whether the two ring ports of the switch receive the loop fault detecting message sent from the opposite end when the message delivery cycle is finished. If so, it is determined that the system operates normally. Otherwise, it is determined that a loop fault occurs in the system.

Figure 6:
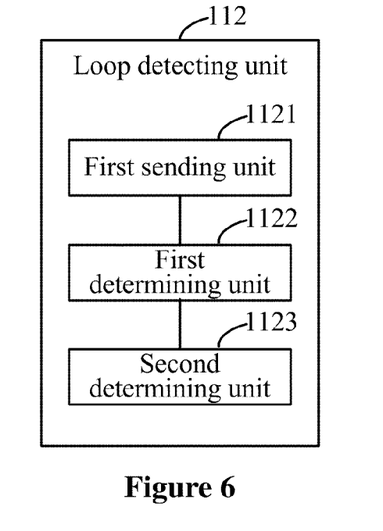
FIG. 6 is a diagram illustrating a structure of a loop detecting unit of the distributed ethernet system according to a fifth embodiment of the present invention.

The loop detecting unit 112 of the switch in the system may further include the second determining unit 1123, as illustrated in FIG. 6. The second determining unit 1123 is adapted to receive the loop fault detecting message sent from another switch, and to determine whether the same loop fault detecting message is received after a predetermined time period. If so, it is determined that the loop operates normally. Otherwise, it is determined that a fault occurs in the loop. The predetermined time period equals to the message delivery cycle.

Figure 7:
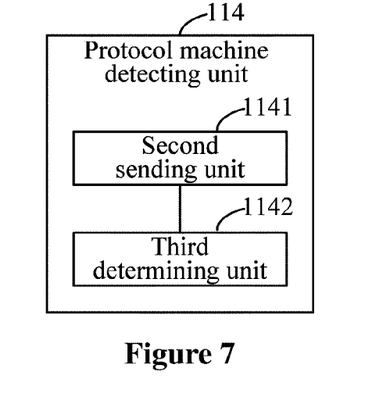
FIG. 7 is a diagram illustrating a structure of a protocol machine detecting unit of the distributed ethernet system according to the fifth embodiment of the present invention.

FIG. 7 is a diagram illustrating a structure of a protocol machine detecting unit of the switch according to a fifth embodiment of the system. The protocol machine detecting unit 114 may include the second sending unit 1141 and the third determining unit 1142. The second sending unit 1141 sends in a unicast manner the link fault detecting message to the adjacent switch via the two ring ports of the switch in a time-setting way. The link fault detecting message includes the Media Access Control (MAC) address of the switch, the MAC address of the adjacent switch and information used for indicating the protocol state of the ring port. If the self checking unit 113 finds that the link connected with the switch operates normally, the third determining unit 1142 determines whether the two ring ports of the switch receive the link fault detecting message from the adjacent switch when the protocol machine detection cycle is finished. If so, it is determined that the protocol machine of the adjacent switch operates normally. Otherwise, it is determined that a protocol machine fault occurs in the adjacent switch.

Figure 8:
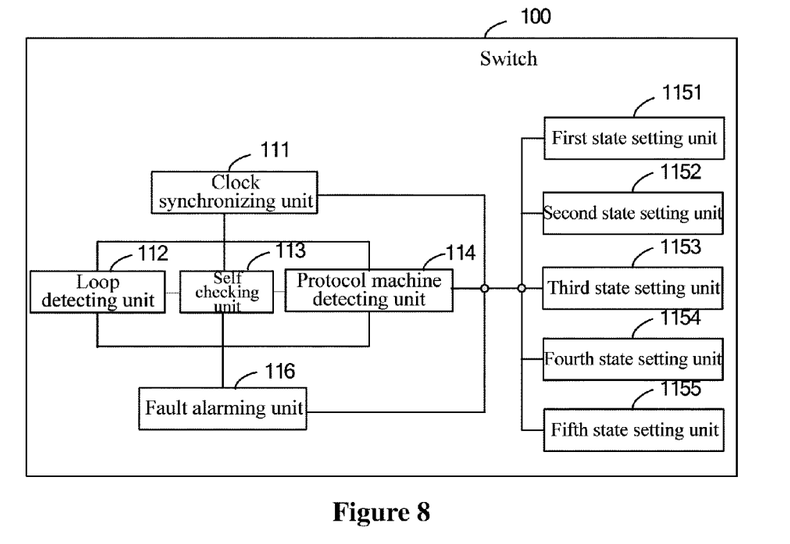
FIG. 8 is a diagram illustrating a structure of a state setting unit of the distributed ethernet system according to the fifth embodiment of the present invention.

The state setting unit 115 may include the first state setting unit 1151, the second state setting unit 1152, the third state setting unit 1153, the fourth state setting unit 1154 and the fifth state setting unit 1145, as illustrated in FIG. 8.

The first state setting unit 1151 sets the protocol state of the ring port of the switch as the "initializing" state before the clock synchronizing unit 111 completes the clock synchronization operation, and sets the protocol state of the ring port of the switch as "blocking" after the clock synchronizing unit 111 completes the clock synchronization operation.

When the system loop detection cycle is finished, if the switch receives a message containing information used for indicating that the ring port is in the "blocking" state, the second state setting unit 1152 sets the state of the two ring ports of the switch as the "forwarding" state. Moreover, after receiving the loop fault detecting message sent from another switch in the system, the switch can know the protocol state of the ring port of another switch according to the loop fault detecting message. If the protocol state of the ring ports of any other switch are all "forwarding", the second state setting unit 1152 sets the protocol state of one of the ring ports of the switch as "blocking" and the protocol state of another as "forwarding".

The third state setting unit 1143 sets the state of the ring port of the switch which ring port is connected with the link as "blocking" when the self checking unit 113 detects occurrence of a fault in the link. When the loop detecting unit 112 of the switch determines that the ring of the system is recovered to operate normally, the "blocking" state of the ring port is maintained, so as to avoid occurrence of loopback in the network.

The fourth state setting unit 1144 sets the protocol state of the ring port connected with the adjacent switch as "blocking" when the protocol machine detecting unit 113 determines that the protocol machine fault occurs in the adjacent switch, and sets the state of the ring port of the switch as "forwarding" when the protocol machine detecting unit 113 determines that the switch in which the protocol machine fault occurs is recovered to operate normally.

The fifth state setting unit 1145 sets the protocol state of the ring port of the switch as "forwarding" after receiving an alarming message from the loop.

The state setting unit 115 of the switch which has been recovered from the fault sets one of the two ring ports of the switch as the "blocking" state, and sets another as the "forwarding" state. Hence, it can be ensured that in the ring of the system, there is only one ring port is in the "blocking" state, thus avoiding occurrence of loopback in the network.

In the network of the system, one switch plays an equal roll to another, and there is no such a difference with respect to the master-slave switches, thus following the principle of fairness in the ethernet communication and solving the problem of the highly converged risks resulted from the uncontrollable influence on the network caused by the fault of the master apparatus. Moreover, according to the embodiment of the present invention, the clock synchronizing unit is employed to synchronize the switch with the system clock, thus improving the clock synchronization accuracy of all switches in the network system and avoiding the negative impact on the real-time performance of the system resulted from the "store-and-forward" mechanism of commonly used switches.

Figure 9:
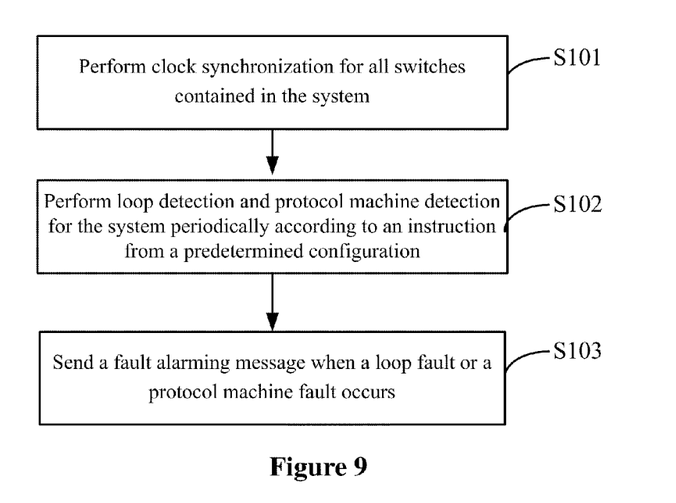
FIG. 9 is a flow chart illustrating an implementation of a fault detecting method based on the distributed ethernet system according to the present invention.

Based on the above system, the present invention further discloses a fault detecting method. FIG. 9 is a flow chart illustrating an implementation of a fault detecting method based on the distributed ethernet system according to the present invention.

Specific steps are as follow.

Step S101: Perform clock synchronization for all switches contained in the system.

Step S102: Perform loop detection and protocol machine detection for the system periodically according to an instruction from a predetermined configuration.

Step S103: Send a fault alarming message when a loop fault or a protocol machine fault occurs.

During the execution of the above steps, the state of the ring port of each switch in the system needs to be set.

Figure 10:
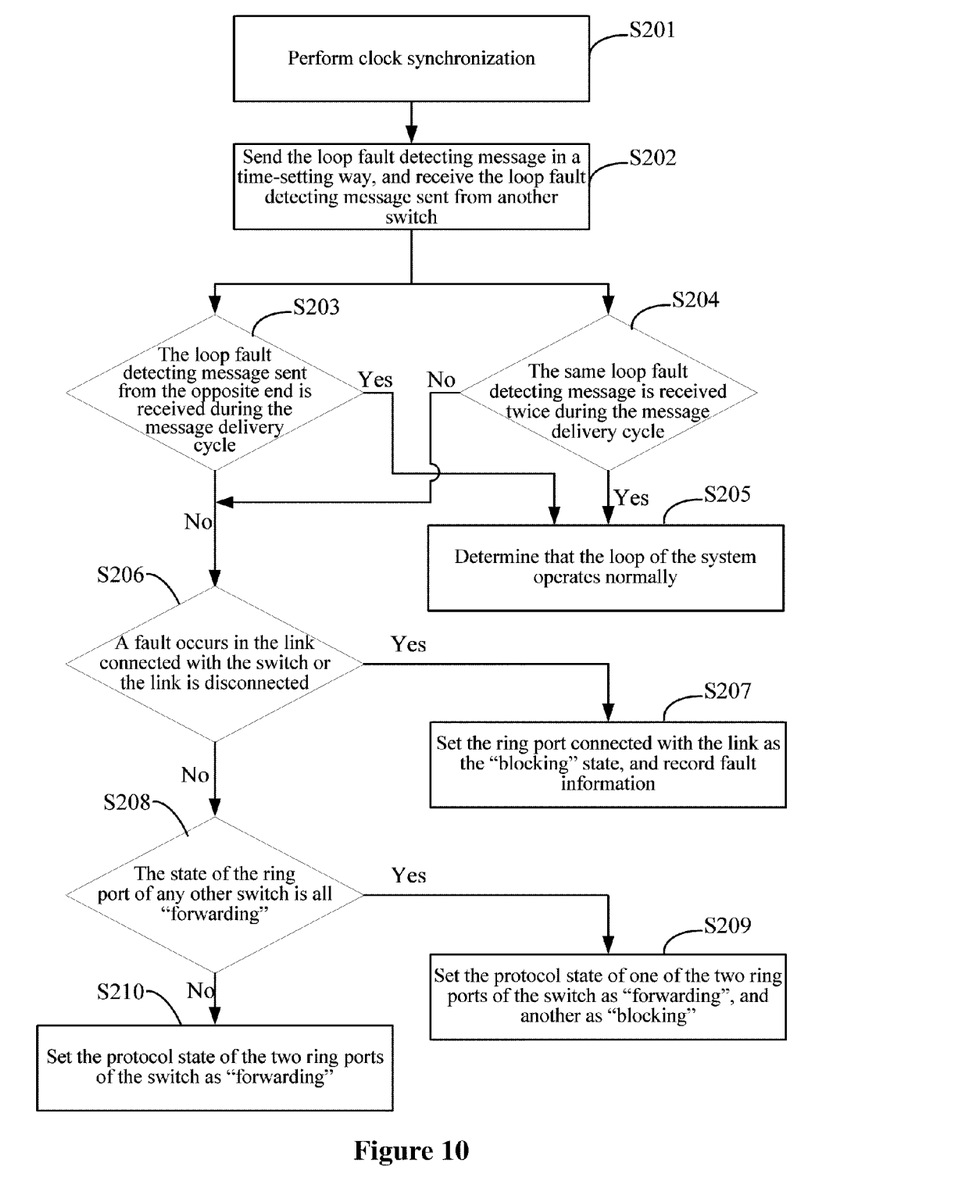
FIG. 10 a flow chart illustrating loop detection in the implementation of the fault detecting method based on the distributed ethernet system according to the present invention.
Figure 11:
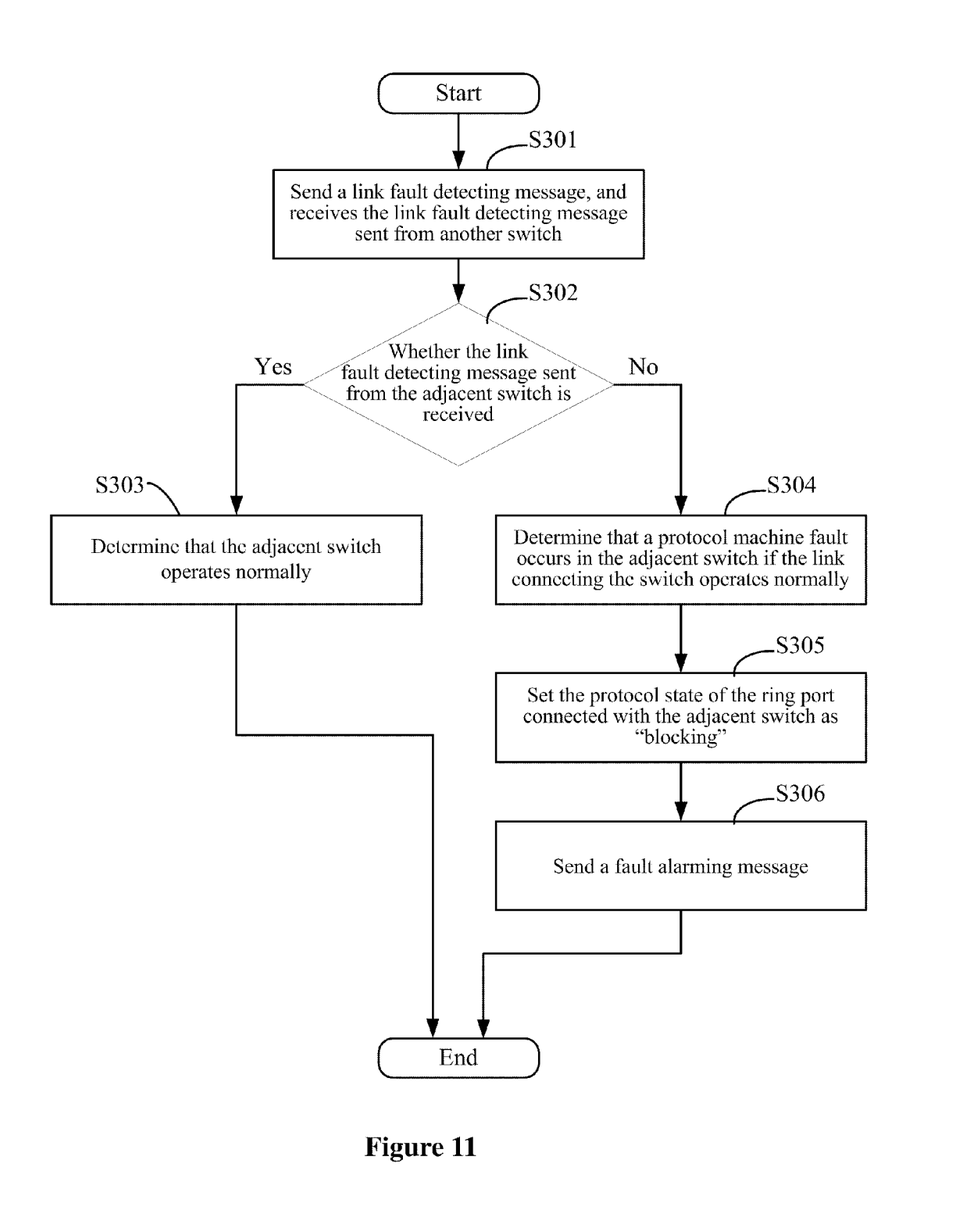
FIG. 11 a flow chart illustrating protocol machine detection in the implementation of the fault detecting method based on the distributed ethernet system according to the present invention.

The technical solution of the present invention is further described hereinbelow with reference to specific examples. FIG. 10 and FIG. 11 are flow charts respectively illustrating loop detection and protocol machine detection of the fault detecting method according to a first embodiment of the present invention.

Before all industrial ethernet switches are connected to the ring, or after the network structure is changed, it is required to deploy a configuration, which includes: a time length of the detection cycle that all the switches send the loop fault detecting message and the link fault detecting message (the detection cycle equals to the sum of a system loop detection cycle, a protocol machine detection cycle and the time for sending the alarming message), and an offset relative to the detection cycle, according to which offset every switch sends the loop fault detecting message and the link fault detecting message.

After determining the configuration, the loop detection and the protocol machine detection is performed one after another for the system according to the instruction from the configuration.

The specific process for performing the loop detection is as follows.

Step S201: Perform clock synchronization.

Step S202: Send the loop fault detecting message in a time-setting way, and receive the loop fault detecting message sent from another switch.

Step S203: Determine whether the loop fault detecting message sent from the opposite end is received during the message delivery cycle. If so, execute Step S205. Otherwise, execute Step S206.

The delivery cycle of the loop fault detecting message refers to the time required for the message to be delivered a cycle in the loop of the system.

Step S204: Determine whether the same loop fault detecting message sent from another switch is received twice during the message delivery cycle. If so, execute Step S205. Otherwise, execute Step S206.

Step S205: Determine that the loop operates normally.

Step S206: Determine whether a fault occurs in the link connected with the switch or the link is disconnected. If so, execute Step S207. Otherwise, execute Step S208.

Step S207: Set the ring port connected with the link as the "blocking" state, and record fault information.

Step S208: When a system loop detection cycle is finished, if the state of the ring port of any other switch is all "forwarding", execute Step S209. Otherwise, execute Step S210.

The system loop detection cycle T=Switch_Number*Maxhandltime, where the Switch_Number refers to the amount of the switches in the system, and the Maxhanltime refers to the message delivery cycle of the loop.

Step S209: Set the protocol state of one of the two ring ports of the switch as "forwarding", and another as "blocking".

Step S210: Set the protocol state of the two ring ports of the switch as "forwarding".

The above fault is a "link fault" of the system. The "link fault" means that a fault occurs in the communication link connected between two industrial ethernet switches. When such a fault occurs, the switch that sends the loop fault detecting message cannot receive the loop fault detecting message sent from the two ring ports during a message delivery cycle, or only one ring port receives the message sent from the opposite port. Any other switch in the system receives the loop fault detecting message only from one ring port, and another loop fault detecting message is lost due to the link fault.

The fault in the system further includes another type of fault, i.e. a "protocol machine fault".

The "protocol machine fault" means that, due to occurrence of a fault in the protocol machine of the switch, the detecting messages and link fault alarming messages of various types cannot be processed and sent. Although the fault has no influence on common data processing, the protocol machine of the switch in which the fault occurs cannot operate, and at this time, it is possible that none of the state of the ring ports in the loop of the system is the "blocking" state, i.e. it is possible that loopback may occur in the network.

According to the above loop detection process, although whether a "link fault" occurs in the ring of the system can be determined according to the loop fault detecting message, neither occurrence of a "protocol machine fault" nor the switch in which the fault occurs can be determined. Thus, in order to determine whether a "protocol machine fault" occurs in the ring of the system and the switch in which the fault occurs, the protocol machine detection needs to be performed. The specific process is as follows.

Step S301: Send a link fault detecting message, and receives the link fault detecting message sent from another switch.

All the switches in the system send the link fault detecting message to the adjacent switch simultaneously, and receive the link fault detecting message sent from another switch.

The link fault detecting message includes: the Media Access Control (MAC) address of the switch, the MAC address of the adjacent switch, and the protocol state of the ring port.

Step S302: Determine whether the link fault detecting message sent from the adjacent switch is received when the protocol machine detection cycle is finished. If so, execute Step S303. Otherwise, execute Step S304.

Step S303: Determine that the adjacent switch operates normally.

Step S304: Determine that a protocol machine fault occurs in the adjacent switch if the link connecting the switch operates normally, and execute Step S305.

Step S305: Set the protocol state of the ring port connected with the adjacent switch as "blocking".

Step S306: Send a fault alarming message.

The alarming message includes information used for indicating the type (a link fault or a protocol machine fault) of the fault and the location at which the fault occurs.

After having been recovered from the fault, the switch in which the protocol machine fault occurs sends the loop fault detecting message. After receiving the loop fault detecting message, other switches set the state of the ring ports all as the "forwarding" state. When a system loop detection cycle is finished, if finding out that the state of the ring ports of the other switches are all "forwarding", the switch having been recovered from the fault sets the protocol state of one ring port of the switch as "forwarding" and sets another as "blocking". If finding out that the state of one of the ring ports of the other switches is "blocking", the switch having been recovered from the fault sets the protocol state of the two ring ports of the switch as "forwarding", thus avoiding occurrence of loopback in the network.

It should be noted that, before Step S201, the protocol state of the ring port of the switch is "initializing". After Step S201 is completed, the protocol state of the ring port of the switch is set as "blocking". After the loop fault detecting message or the link fault detecting message sent from another switch is received, the protocol state of the ring port of the switch is set as "forwarding".

Moreover, for a switch newly added into the system, after synchronization is performed for the clock of the switch, the switch sets the protocol state of the ring port of the switch as "blocking". After the loop fault detecting message and the link fault detecting message is sent, the protocol state of one of the two ring ports of the switch is set as "forwarding", and the protocol state of another ring port is set as "blocking". At this time, after another switch receives the loop fault detecting message sent from the newly added switch, if the protocol state of the ring port of the another switch is "blocking", it is changed to "forwarding". If the protocol state of the ring port of the another switch is "forwarding", the state is maintained.

The above disclosure merely represents the preferred embodiments of the present invention, instead of being intended to limit the present invention. Variations devised by those skilled in the art without exerting an inventive effort, and modifications and alterations without departing from the principle of the present invention are considered as falling into the scope of the present invention.

What is claimed is:

1. A distributed ethernet system comprising a plurality of switches, the plurality of switches are connected in sequence to form a ring, wherein after being synchronized in clock, each switch of the plurality of switches is adapted to:
   periodically perform sequential loop detection for detecting a loop of the system by sending a loop fault detecting message for detecting a loop fault, and protocol machine detection for detecting whether a protocol machine fault occurs in a protocol machine of an adjacent switch by sending a link fault detecting message to the adjacent switch according to a predetermined configuration, wherein:
      all switches of the plurality of switches send the link fault detecting message simultaneously, and
      when the protocol machine fault is detected in the protocol machine of the adjacent switch, the protocol machine fault indicates that common data can be processed by the adjacent switch and that at least one detecting message and at least one link fault alarming message cannot be processed and sent by the adjacent switch; and
   each of the plurality of switches is further adapted to send a fault alarming message when at least one of the loop fault and the protocol machine fault occur.

2. The system according to claim 1, wherein each switch of the switches comprises:
   a clock synchronizing unit, adapted to adjust the switch to be synchronous in clock with the system;
   a loop detecting unit, adapted to perform detection for a loop of the system;
   a self checking unit, adapted to check an operation status of a link connected with the switch after the loop detecting unit detects occurrence of a fault in the loop of the system, and to perform a recordation;
   a protocol machine detecting unit, adapted to perform the protocol machine detection for an adjacent switch of the switch;
   a fault alarming unit, adapted to send in a multicast manner an alarming message containing information used for indicating a type of the fault and a location at which the fault occurs when at least one of the loop detecting unit, the self checking unit and the protocol machine detecting unit detect the fault; and
   a state setting unit, adapted to set a protocol state of a ring port of the switch according to an instruction from the predetermined configuration and based on the state of a ring port of another switch when at least one of the loop detecting unit, the self checking unit and the protocol machine detecting unit detect the fault.

3. The system according to claim 2, wherein the loop detecting unit comprises:
   a first sending unit, adapted to send in the multicast manner a loop fault detecting message via two ring ports of the switch periodically, wherein the loop fault detecting message includes a Media Access Control address of, the switch and information used for indicating protocol states of the two ring ports of the switch; and
   a first determining unit, adapted to determine after the first sending unit sends the loop fault detecting message whether the two ring ports of the switch receive the loop fault detecting message sent from an opposite end when a loop detection cycle is finished, to determine that the system operates normally if so, and to determine that the loop fault occurs in the system otherwise.

4. The system according to claim 3, wherein the loop detecting unit further comprises:
   a second determining unit, adapted to receive the loop fault detecting message sent from another switch, to determine whether the same loop fault detecting message is received during a time period equal to a message delivery cycle, to determine that the system operates normally if so, and to determine that the loop fault occurs in the system otherwise.

5. The system according to claim 4, wherein the protocol machine detecting unit comprises:
   a second sending unit, adapted to send in a unicast manner a link fault detecting message to the adjacent switch periodically, wherein the link fault detecting message includes a Media Access Control address of the switch, a Media Access Control address of the adjacent switch and information used for indicating a protocol state of the ring port of the switch via which the link fault detecting message is sent to the adjacent switch; and
   a third determining unit, adapted to determine after the second sending unit sends the link fault detecting message whether the ring port of the switch receives the link fault detecting message sent from the adjacent switch when a protocol machine detection cycle is finished, to determine that a protocol machine of the adjacent switch operates normally if so, and to determine that the protocol machine fault occurs in the adjacent switch otherwise.

6. The system according to claim 5, wherein the state setting unit comprises:
   a first state setting unit, adapted to set the protocol state of the two ring ports of the switch as an "initializing" state before the clock synchronizing unit completes a clock synchronization operation, and to set the protocol state of the two ring ports of the switch as "blocking" after the clock synchronizing unit completes the clock synchronization operation;
   a second state setting unit, adapted to set the protocol state of the two ring ports of the switch as a "forwarding" state when the switch receives a message containing information used for indicating that the ring port is in the "blocking" state, and to set the state of one of the ring ports of the switch as "blocking" and the state of another as "forwarding" when the switch finds out that the ring port of any other switch in the ring all is in the "forwarding" state;

a third state setting unit, adapted to set the state of the ring port of the switch which ring port is connected with the link as "blocking" when the self checking unit detects a fault in the link, and to maintain the "blocking" state for the ring port when the loop detecting unit of the switch determines that the ring of the system is recovered to operate normally;

a fourth state setting unit, adapted to set the protocol state of the ring port connected with the adjacent switch as "blocking" when the protocol machine detecting unit determines that the protocol machine fault occurs in the adjacent switch, and to set the state of the ring port of the switch as "forwarding" when the protocol machine detecting unit determines that the switch in which the protocol machine fault occurs is recovered to operate normally; and a fifth state setting unit, adapted to set the protocol state of the ring port of the switch as "forwarding" after receiving the alarming message from the loop.

7. The system according to claim 3, wherein the protocol machine detecting unit comprises:

a second sending unit, adapted to send in a unicast manner a link fault detecting message to the adjacent switch periodically, wherein the link fault detecting message includes a Media Access Control address of the switch, a Media Access Control address of the adjacent switch and information used for indicating a protocol state of the ring port of the switch via which the link fault detecting message is sent to the adjacent switch; and a third determining unit, adapted to determine after the second sending unit sends the link fault detecting message whether the ring port of the switch receives the link fault detecting message sent from the adjacent switch when a protocol machine detection cycle is finished, to determine that a protocol machine of the adjacent switch operates normally if so, and to determine that the protocol machine fault occurs in the adjacent switch otherwise.

8. The system according to claim 7, wherein the state setting unit comprises:

a first state setting unit, adapted to set the protocol state of the two ring ports of the switch as an "initializing" state before the clock synchronizing unit completes a clock synchronization operation, and to set the protocol state of the two ring ports of the switch as "blocking" after the clock synchronizing unit completes the clock synchronization operation;

a second state setting unit, adapted to set the protocol state of the two ring ports of the switch as a "forwarding" state when the switch receives a message containing information used for indicating that the ring port is in the "blocking" state, and to set the state of one of the ring ports of the switch as "blocking" and the state of another as "forwarding" when the switch finds out that the ring port of any other switch in the ring all is in the "forwarding" state;

a third state setting unit, adapted to set the state of the ring port of the switch which ring port is connected with the link as "blocking" when the self checking unit detects a fault in the link, and to maintain the "blocking" state for the ring port when the loop detecting unit of the switch determines that the ring of the system is recovered to operate normally;

a fourth state setting unit, adapted to set the protocol state of the ring port connected with the adjacent switch as "blocking" when the protocol machine detecting unit determines that the protocol machine fault occurs in the adjacent switch, and to set the state of the ring port of the switch as "forwarding" when the protocol machine detecting unit determines that the switch in which the protocol machine fault occurs is recovered to operate normally; and a fifth state setting unit, adapted to set the protocol state of the ring port of the switch as "forwarding" after receiving the alarming message from the loop.

9. The system according to claim 2, wherein the protocol machine detecting unit comprises:

a second sending unit, adapted to send in a unicast manner a link fault detecting message to the adjacent switch periodically, wherein the link fault detecting message includes a Media Access Control address of the switch, a Media Access Control address of the adjacent switch and information used for indicating a protocol state of the ring port of the switch via which the link fault detecting message is sent to the adjacent switch; and a third determining unit, adapted to determine after the second sending unit sends the link fault detecting message whether the ring port of the switch receives the link fault detecting message sent from the adjacent switch when a protocol machine detection cycle is finished, to determine that a protocol machine of the adjacent switch operates normally if so, and to determine that the protocol machine fault occurs in the adjacent switch otherwise.

10. The system according to claim 9, wherein the state setting unit comprises:

a first state setting unit, adapted to set the protocol state of the two ring ports of the switch as an "initializing" state before the clock synchronizing unit completes a clock synchronization operation, and to set the protocol state of the two ring ports of the switch as "blocking" after the clock synchronizing unit completes the clock synchronization operation;

a second state setting unit, adapted to set the protocol state of the two ring ports of the switch as a "forwarding" state when the switch receives a message containing information used for indicating that the ring port is in the "blocking" state, and to set the state of one of the ring ports of the switch as "blocking" and the state of another as "forwarding" when the switch finds out that the ring port of any other switch in the ring all is in the "forwarding" state;

a third state setting unit, adapted to set the state of the ring port of the switch which ring port is connected with the link as "blocking" when the self checking unit detects a fault in the link, and to maintain the "blocking" state for the ring port when the loop detecting unit of the switch determines that the ring of the system is recovered to operate normally;

a fourth state setting unit, adapted to set the protocol state of the ring port connected with the adjacent switch as "blocking" when the protocol machine detecting unit determines that the protocol machine fault occurs in the adjacent switch, and to set the state of the ring port of the switch as "forwarding" when the protocol machine detecting unit determines that the switch in which the protocol machine fault occurs is recovered to operate normally; and a fifth state setting unit, adapted to set the protocol state of the ring port of the switch as "forwarding" after receiving the alarming message from the loop.

11. A fault detecting method based on a distributed ethernet system, comprising:

performing clock synchronization for all switches contained in the system;

performing, by a switch of the switches, loop detection for detecting a loop of the system by sending a loop fault detecting message periodically;

performing, by the switch of the switches, protocol machine detection for detecting whether a protocol machine fault occurs in a protocol machine of an adjacent switch by sending a link fault detecting message to the adjacent switch periodically according to an instruction from a predetermined configuration, wherein:

all of the switches send the link fault detecting message simultaneously, and when the protocol machine fault is detected in the protocol machine of the adjacent switch, the protocol machine fault indicates that common data can be processed by the adjacent switch and that at least one detecting message and at least one link fault alarming message cannot be processed and sent by the adjacent switch; and sending, by the each of the switches, a fault alarming message when at least one of a loop fault and a protocol machine fault occur.

12. The method according to claim 11, wherein the loop detection is performed according to following steps:

sending, by each of the switches, in a multicast manner a loop fault detecting message via two ring ports of the switch to the system at a predetermined time interval;

detecting a link connected with the switch if not both of the two ring ports of the switch receive the loop fault detecting message sent from the ring port of an opposite end when a message delivery cycle is finished;

setting a state of the ring port of the switch which ring port is connected with the link as "blocking" in at least one of following conditions: if a fault occurs in the link connected with the switch and if the link is disconnected, and further determining the protocol state of the ring port of another switch otherwise; and setting the state of one of the two ring ports of the switch as a "forwarding" state and the state of another as the "blocking" state if the protocol state of the ring port of any other switch all is "forwarding", and setting the protocol state of the two ring ports of the switch both as "forwarding" otherwise.

13. The method according to claim 12, the protocol machine detection is performed according to following steps:

sending, by all the switches when a protocol machine detection cycle starts, a link fault detecting message to an adjacent switch simultaneously; and if the link connected with the switch operates normally, determining whether the ring port of the switch receives a protocol machine detecting message sent from the adjacent switch when the protocol machine detection cycle is finished, determining that the adjacent switch operates normally if so, and determining that the protocol machine fault occurs in the adjacent switch otherwise.

14. The method according to claim 13, wherein the fault alarming message is sent according to following steps:

sending, by all the switches in the system, the fault alarming message in the multicast manner after the protocol machine detection is completed, wherein the fault alarming message includes information used for indicating occurrence of the loop fault and/or the protocol machine fault and information used for indicating a location at which the fault occurs.

15. The method according to claim 12, wherein the fault alarming message is sent according to following steps:

sending, by all the switches in the system, the fault alarming message in the multicast manner after the protocol machine detection is completed, wherein the fault alarming message includes information used for indicating occurrence of the loop fault and/or the protocol machine fault and information used for indicating a location at which the fault occurs.

16. The method according to claim 11, wherein the fault alarming message is sent according to following steps:

sending, by all the switches in the system, the fault alarming message in the multicast manner after the protocol machine detection is completed, wherein the fault alarming message includes information used for indicating occurrence of at least one of the loop fault and the protocol machine fault and information used for indicating a location at which the fault occurs.

* * * * *